United States Patent [19]

Rabilloud et al.

[11] 4,304,898

[45] Dec. 8, 1981

[54] THERMOSETTING POLYARYLQUINOXALINE RESINS AND THEIR USE, PARTICULARLY IN ENAMELING VARNISHES

[75] Inventors: Guy Rabilloud, Grenoble; Bernard Sillion, Lyons, both of France

[73] Assignee: Institut Francais du Petrole, Rueil-Malmaison, France

[21] Appl. No.: 113,167

[22] Filed: Jan. 18, 1980

[30] Foreign Application Priority Data

Jan. 19, 1979 [FR] France .............................. 79 01566

[51] Int. Cl.$^3$ .............................................. C08G 73/06
[52] U.S. Cl. .................................. 528/125; 427/388.2; 428/457; 428/460; 528/229
[58] Field of Search ................................ 528/125, 229; 427/388.2; 428/457, 460

[56] References Cited

U.S. PATENT DOCUMENTS

| | | | |
|---|---|---|---|
| 2,895,944 | 7/1959 | Mark | 528/229 |
| 3,661,850 | 5/1972 | Stille | 528/126 |
| 3,804,807 | 4/1974 | Duffy | 528/229 |
| 3,852,243 | 12/1974 | Hergenrother | 528/229 |
| 3,876,614 | 4/1975 | Hedberg et al. | 528/229 |
| 3,904,584 | 9/1975 | Jones et al. | 528/229 |

OTHER PUBLICATIONS

J. Am. Chem. Soc. 82, 1960, p. 5553.

*Primary Examiner*—Maurice J. Welsh
*Attorney, Agent, or Firm*—Millen & White

[57] ABSTRACT

Enameling varnishes are made from particular polyarylquinoxaline resins; these resins comprise, in addition to arylquinoxaline groups, biphenylene or biquinoxalylene groups and their inherent viscosity at 30° C. and 0.5 g/dl concentration in m-cresol is from 0.5 to 1.3 dl/g.

26 Claims, No Drawings

THERMOSETTING POLYARYLQUINOXALINE RESINS AND THEIR USE, PARTICULARLY IN ENAMELING VARNISHES

BACKGROUND OF THE INVENTION

This invention has for object new thermosetting polyarylquinoxaline resins, which can be used for manufacturing insulation materials, particularly for enameling electric conductors adapted for use under conditions requiring increased heat stability and good resistance to thermal shock. It concerns particularly the synthesis of polymers which can be used over long periods at temperatures between 250° and 350° C. or over shorter periods at temperatures between 350° and 450° C. The polymers of the invention are also insensitive to the solvents which may contact the enameled conductor, such as ketones, alcohols, aliphatic and aromatic hydrocarbons, halogenated hydroarbons or phenol solvents.

The invention more particularly contemplates straight-chain polyarylquinoxaline resins having biphenylene and/or biquinoxalylene linkages, either inside the macromolecular chain or at the ends thereof, or again in both positions.

It is known that the polyarylquinoxalines prepared by condensation of aromatic tetra-amines with aromatic bis-α-diketones are usually linear and thermoplastic thermostable polymers, soluble in certain organic solvents. Since they hve very high molecular weights, these polymers yield highly viscous solutions, even at concentrations ranging between 5 and 10% by weight in phenolic solvents. Since the viscosity may attain several hundreds poises at a 10% concentration, such solutions cannot be used for the coating of electric conductors. When decreasing the polymer concentration to a very low level of about 4 to 6%, it is possible to enamel the electric conductors, but a sufficient thickness of the insulator cannot be attained without multiplying unreasonably the number of passages of the electric conductor in the impregnation solution. Even in these conditions, the very high molecular weight of the polyarylquinoxalines is disadvantageous, since the polymer does not adhere to the metal properly and an insulating sheath forms, which slips easily along the conductor. On the contrary, the enameling varnish must adhere to the metal and constitute with the latter a flexible and solid assembly, capable to withstand high mechanical stresses.

It is also known that the polyarylquinoxalines of lower molecular weight have a too low thermoplasticity temperature for use at 300° C. or above. It has also been observed that the limitation to sufficiently low molecular weights when preparing enameling solutions having a viscosity between 3000 and 6000 cP for a 15 to 20% polymer concentration in the enameling solvent, yields varnishes having poor film properties, without flexibility and whose adherence to the metal is low.

DETAILED DISCUSSION

It has been found, and this is one of the features of the invention, that there exists a relatively narrow range of molecular weights wherein the polyrylquinoxalines may be used for preparing enameling varnishes. For practical purposes the inherent viscosity of the polyarylquinoxalines is used to determine this range of molecular weights. The determination of the inherent viscosity is effected at 30° C. at a polymer concentration of 0.5 g/dl in m-cresol according to conventional techniques. The polyarylquinoxalines of inherent viscosity from 0.5 to 1.3 dl/g have overall properties allowing their use as enameling varnish. These polymers have a good stability during storage, they adhere properly to the metal without crack defects and they have a sufficient flexibility. In spite of these interesting properties, these polymers cannot be used at high temperature since their thermoplasticity level ranges between 210° and 350° C., depending on the nature of the monomers employed. As a matter of fact, for use in continuous service at a temperature of, for example, 300° C., it is preferable to use a polymer having a much higher thermoplastic strain temperature, i.e. about 400° to 450° C.

Since the polyarylquinoxalines are soluble in a number of organic solvents, such as chlorinated aliphatic and aromatic solvents, phenols, halogenated phenols, pyridine and aprotic polar solvents, the enameling varnishes cannot be used in the presence of these solvents.

In the case of the conventional enameling varnishes, the thermoplasticity and the solubility of the polymers are modified by adding tri-functional monomers which may induce, when enameling, cross-linking reactions of the macromolecular chains. This type of reaction has low interest with the polyarylquinoxalines, since the cross-linking through ester or amide linkages reduces the heat stability of the resin and its resistance to oxidation and hydrolysis. For use at 300° C., only the carbon-carbon linkages may be used to cross-link the base linear polymers. The temperatures attained in the enameling ovens (450° to 500° C.) are sufficiently high to form such linkages by a free-radical method, provided compounds are added to the polymer to form free radicals at a temperature between 250° and 500° C.

It has been found, and this is another feature of the invention, that the introduction of a small amount of biphenylene or biquinoxalylene into the macromolecular chains of the polyarylquinoxalines for use as enameling varnishes, allows the cross-linking of the polymers in the enameling oven and a high increase of their thermoplastic strain temperature. Among the compounds which can be used as cross-linking agents, the following may be mentioned: 2-phenylglyoxyloyl-biphenylene, 2-phenylglyoxyloyl-biquinoxalylene, 2,6-bis-phenylglyoxyloyl biphenylene, 2,7-bis-phenylglyoxyloyl-biphenylene, 2,8-bis-phenylglyoxyloyl biquinoxalylene and 2,9-bis-phenylglyoxyloyl-biquinoxalylene, which are represented by the respective formulas (1), (2), (3), (4), (5) and (6).

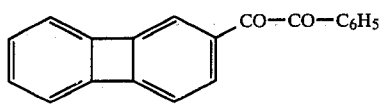
(1)

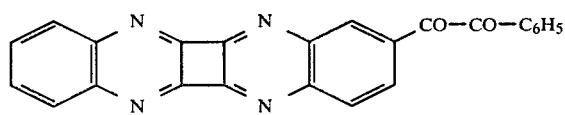
(2)

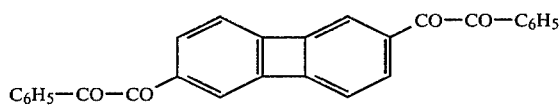
(3)

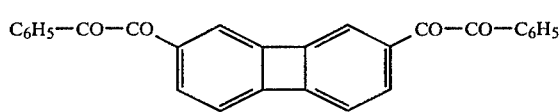
(4)

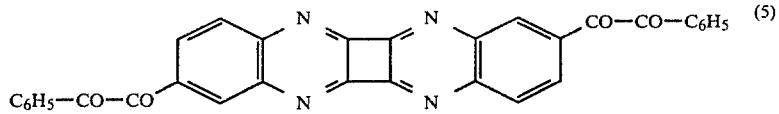
(5)

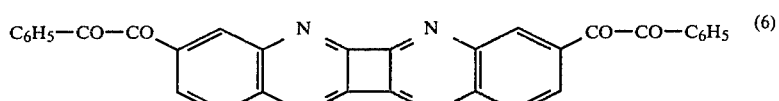
(6)

The polyarylquinoxalines which may be used according to this invention have preferably molecular weights corresponding to an inherent viscosity of the polymer ranging between 0.5 and 1.3 dl/g. As a matter of fact, the polyarylquinoxalines of the prior art are very high polymers whose inherent viscosity may attain 3 dl/g or more. It is thus necessary to control with precision the molecular weight (or the viscosity) by adjusting the respective proportions of the various reactants. In fact, if one of the reactants is in excess with respect to the other, the molecular weight of the condensation polymer is lower than with the exact stoichiometrical proportion. In that case, the macromolecular chains are statistically terminated with the functional groups of the reactant in excess, and these functional groups can react with chemical agents which neutralize their reactivity.

The polyarylquinoxalines of the invention may be represented by the general formula

(7)

where P is a recurrent unit of the general formula:

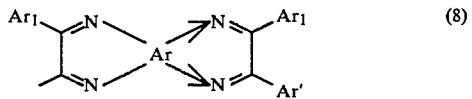
(8)

where the radical Ar is a tetravalent carbocyclic or heterocyclic aromatic radical whose four valences are on distinct carbon atoms located in pairs, each pair representing ortho positions. The radical Ar may be formed of one or several (for example 2 to 6) rings, which may be joined or linked, each ring being preferably formed of 5 to 7 atoms; part of them may consist of oxygen, sulfur and/or nitrogen atoms.

When the radical Ar has several linked rings, the junction elements are, for example, the direct bond or one of the following divalent atoms and groups:

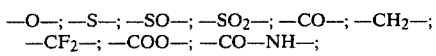

In the formula (8), the arrows linking the radical Ar to the nitrogen atoms represent a possible isomerism.

Usually the radical Ar comprises one or two aromatic rings.

The radical Ar' is a divalent carbocyclic aromatic radical whose two valences are located on distinct carbon atoms. The radical Ar' may be formed of one or several (for example 2 to 6) rings, which are then joined or linked, each ring being preferably formed of 5 to 7 carbon atoms.

When the radical Ar' has several linked rings, the junction elements are, for example, the direct bond or one of the atoms or groups above mentioned as junction elements for the radicals Ar.

In most cases, the radical Ar' comprises one or two aromatic rings.

The identical or different radicals $Ar_1$ are monovalent carbocyclic aromatic radicals, preferably phenyl radicals.

The subscript n is an integer representing the polycondensation degree, which must be sufficiently high to obtain a polymer having an inherent viscosity between 0.5 and 1.3 dl/g, when measured in the above defined conditions.

As concerns the polymers of the formula (7), B represents a recurrent unit of the general formula:

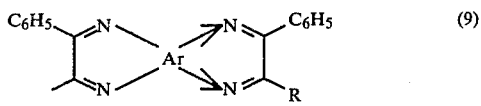
(9)

Where Ar has the above-mentioned meaning and the radical R is a divalent biphenylene radical whose two valences are located on the carbon atoms in the positions 2 and 6 or 2 and 7, or a divalent biquinoxalylene radical whose two valences are located on carbon atoms in the positions 2 and 8 or 2 and 9.

The subscript m is zero or a positive integer, expressing the polycondensation degree of the unit (9). The value of m is not determined directly, but can be roughly deduced from the ratio of the reactants; it is always far smaller than the number n which represents the polycondensation degree of the base recurrent unit of the formula (8).

In the general formula (7), T represents the terminal elements of the macromolecular chains. Depending on the conditions of manufacture of the polyarylquinoxalines, the polymers are terminated with non-reactive groups, with functional groups, or with crosslinkable hydrocarbons. These terminal elements are represented by the general formula:

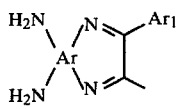 (10)

or by the general formula:

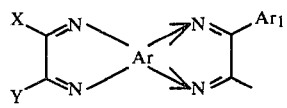 (11)

where Ar and $Ar_1$ have the above meanings, X is a monovalent aromatic radical such as $Ar_1$, particularly a phenyl radical, and Y is a monovalent aromatic radical complying with one of the following general formulas:

$$Ar_1-CO-CO-Ar' \qquad (12)$$

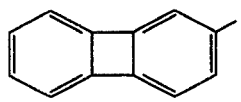 (13)

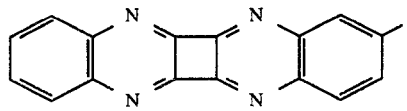 (14)

$C_6H_5-$ (15)

and

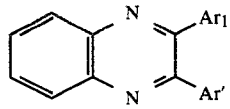 (16)

where Ar' and $Ar_1$ have the above mentioned meanings, provided at least one of the following conditions is fulfilled:

(a)—m in the formula (7) is a positive integer; and/or
(b)—Y in the formula (11) complies with the formula (13) or the formula (14). The two groups T of the formula (7) may be identical or different.

The synthesis of these polyarylquinoxalines may be performed by reacting at least one aromatic tetra-amine of the general formula:

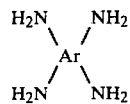 (17)

where Ar has the above-mentioned meaning, with at least one aromatic bis-α-diketone of the general formula:

$$Ar_1-CO-CO-Ar'-CO-CO-Ar_1 \qquad (18)$$

where Ar' and $Ar_1$ have the above-mentioned meanings.

Examples of aromatic tetra-amines of the formula (17) which can be used according to the invention are: 1,2,4,5-tetra-amino-benzene, 3,3',4,4'-tetra-amino-biphenyl, bis(3,4-diamino phenyl)ether, bis(3,4-diamino phenyl) methane, bis(3,4-diamino phenyl)ketone, bis(3,4-diamino phenyl) sulfide, bis(3,4-diamino phenyl)sulfoxide, bis(3,4-diamino phenyl) sulfone, phenyl 3,3',4,4'-tetraaminobenzoate and 3,3',4,4'-tetraamino benzanilide.

Examples of aromatic bis-α-diketones of the formula (18) which can be used according to the invention are: 1,4- and 1,3-bis(phenylgloxyloyl) benzenes, 4,4'-bis-(phenylglyoxyloyl) biphenyl, 4,4''-bis-(phenylglyoxyloyl)-m.terphenyl, bis-(4-phenylglyoxyloyl-phenyl) ether, bis-(4-phenylglyoxyloyl-phenyl) sulfide, bis-(4-phenylglyoxyloylphenyl) sulfoxide, bis-(4-phenylglyoxyloyl-phenyl) sulfonte and bis-(4-phenylglyoxyloyl-phenyl) ketone.

Highly thermosettable enameling varnishes are prepared by using preferably, as tetra-amine of the formula (17), 3,3',4,4'-tetraamino biphenyl, and, as bis-α-diketone of the formula (18), 1,4-bis(phenylglyoxyloxy) benzene or 1,3-bis-(phenylglyoxyloyl) benzene.

In order to control the molecular weight, the polycondensation reaction is preferably conducted in an appropriate solvent, for example, phenol, a cresol, a chlorophenol, chloform, chlorobenzene, dioxane, pyridine or an aprotic polar solvent. These solvents may be used individually or as mixtures, or again as mixtures with diluents, such as benzene, toluene, xylenes and aromatic hydrocarbon cuts.

The reaction temperature is not critical, and may be selected between 10° and 250° C.; in these conditions, the resultant polymers do not suffer from degradation reactions.

Since the tetra-amines are highly oxidizable compounds, the reaction will be preferably conducted in a nitrogen or argon nonoxidizing atmosphere.

In the reaction of formation of the polyarylquinoxalines of formula (7), the molecular weight of the polymers is adjusted to the desired level by using an excess of one of the reactants. It is thus possible to proceed in two different manners.

The reaction may be performed by adding progressively at least one tetra-ketone of the formula (18) to at least one tetraamine of the formula (17), present in the reaction solvent. Between each addition of the first reactant to the second one, it is preferable to allow the condensation reaction to proceed in major part, which can be controlled by the dissolution of the added reactant and the change in the solution viscosity. When the desired viscosity has been reached, the polyarylquinoxalines have an excess of amine groups which constitute the chain ends, and the polymer will be represented by the general formula:

$$T(P)_nT \qquad (19)$$

and more precisely by the general formula:

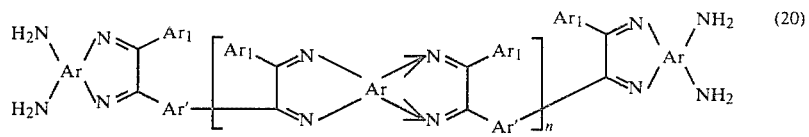 (20)

where Ar, Ar', Ar$_1$ and n have the above-mentioned meanings.

The cross-linking agent of formula (1) or (2) is supplied at the end of the polycondensation reaction to block the available o-diamine functions. This reaction gives polymers of the general formula:

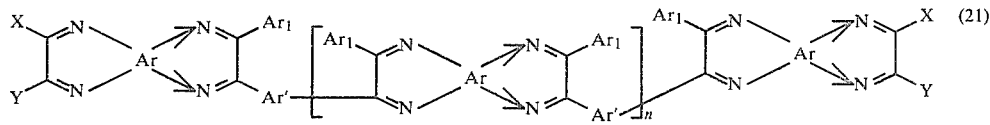 (21)

where X is a phenyl radical and Y is a monovalent aromatic radical of the formula (13) or (14).

The synthesis of the cross-linkable polyarylquinoxalines useful as enameling varnishes may also be effected according to the same process of adding the tetraketone reactant to an excess of the tetra-amine, by using, as tetraketone reactant, a mixture formed of a major constituent of the formula (18) with one or more minor constituents of the formula (3), (4), (5) or (6). This polycondensation reaction yields a co-polymer of the general formula:

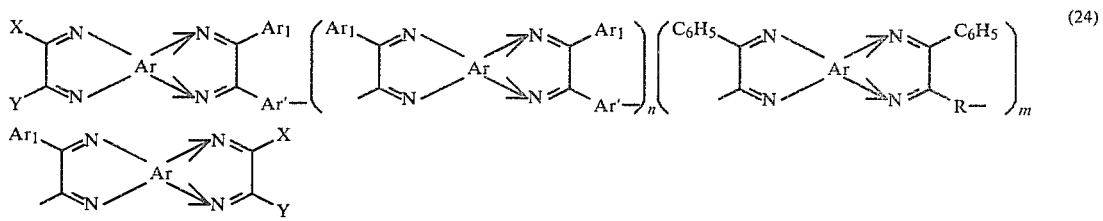 (24)

where the radical Ar$_1$ has the above-mentioned meanings. In most cases, the radical Ar$_1$ is a phenyl radical; thus the diketone of the formula (23) is benzil. The blocking reactant for the amine functions may also be an α-diketone of the formula (1) or (2).

At the end of the reaction of the polymer of formula (22) with an aromatic diketone of the formula (1), (2) or (23), the crosslinkable polyarylquinoxalines have the general formula:

where X is an Ar$_1$ radical, preferably a phenyl radical, and Y is a radical of the formula (13) or (14) or a radical Ar$_1$, and, in that case, preferably a phenyl radical.

Cross-linkable polyarylquinoxalines of the formula (7) may also be prepared by adding progressively an aromatic tetra-amine of the formula (17) to an excess of a mixture containing a major proportion of tetraketone

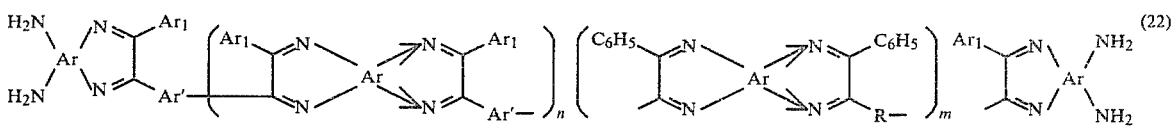 (22)

where Ar, Ar', Ar$_1$, R, n and m have the above-mentioned meanings. Since an excess of tetra-amine is used, the macromolecular chains are statistically terminated with functional o-diamine groups. To improve the thermostability of the enameling varnish, these groups are preferably neutralized by adding an aromatic α-diketone of the general formula:

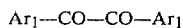 Ar$_1$—CO—CO—Ar$_1$ (23)

of the formula (18) and a minor proportion of one or more tetraketones of the formulas (3), (4), (5) and (6), present in the reaction solvent. As above mentioned, the condensation is allowed to proceed in major part between each addition and, when the desired viscosity has been attained, there are obtained polyarylquinoxalines statistically terminated with the α-diketone functions of the major monomer, complying with the general formula:

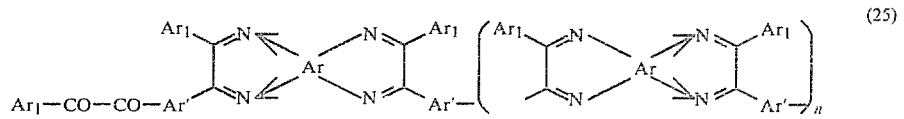 (25)

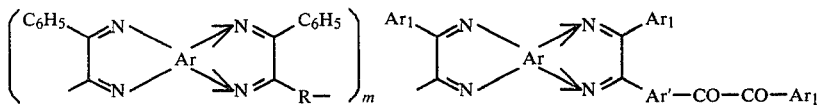

where Ar, Ar', Ar$_1$, R, n and m have the above-mentioned meanings.

To improve the heat stability of the enameling varnishes, the α-diketone groups terminating the macromolecular chains are preferably converted to quinoxaline rings by addition of an aromatic ortho-diamine, in most cases ortho-phenylene diamine. The resultant polymers have the general formula:

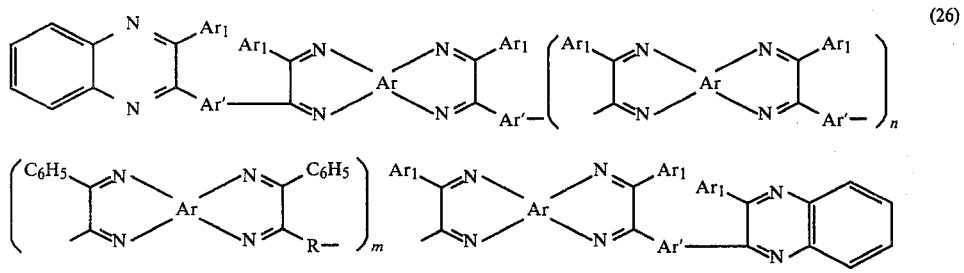

The enameling varnishes of the present invention thus consist of linear, film-forming polyarylquinoxalines which can be crosslinked by heating; they are thus thermosetting. Their inherent viscosity, determined at 30° C. with a polymer concentration of 0.5 g/dl in m.cresol, is preferably from 0.5 to 1.3 dl/g. The cross-linking centers may be present either only at the ends of the macromolecular chains or only inside the chains, or in both positions, so that the polymers may be represented by the formulas (21), (22), (24), (25) and (26).

Although they are useful for enameling metal conductors, the polymers of the formulas (22) and (25) have a lower resistance to heat and oxidation on account of the functional o-diamine or of the α-diketone functional groups located at the ends of the chains. For this reason, the preferred polymers are those having the formulas (21), (24) and (26).

One of the essential features of the polymers of the invention is their content of biphenylene and/or biquinoxalylene as crosslinking agents. These compounds are subjected to a reaction of ring opening, during their passage in the enameling oven, with formation of new carbon-carbon bonds between the macromolecular chains. Chemical cross-linking takes place without evolution of volatile compounds and the cross-linking rate is approximately proportional to the amount of the cross-linking agent introduced into the polymers.

The amount of the cross-linking agent may vary widely; it is however selected sufficiently low to find a good compromise between the flexibility of the enamel and its thermoplasticity. The latter depends on the nature of the main monomers which are used to synthesize the base polymers whose recurrent unit is represented by the formula (8). As a rule, it may vary from 230° to 350° C., depending on the monomers employed and the molecular weight attained. Since the crosslinking agent is used to increase the thermoplasticity temperature up to, for example, 400° or 450° C., this agent will be used in the amount strictly necessary to attain the desired value. As a matter of fact, any increase of the thermoplasticity temperature results in a decrease of the varnish flexibility.

When the cross-linking agent is present only at the ends of the chains, as in the polymers of the formula (21), the difference in the stoichiometrical proportions of the monomers of the formulas (17) and (18) gives the amount of cross-linking agent to be introduced. By taking into account the technical requirements of use of the enameling varnishes, there will be used polymers made with, for example, 100 moles of tetra-amine of the formula (17) and an amount of tetraketone of the formula (18) which may range from 90 to 99.999 moles. The excess of the o-diamine groups is then neutralized by adding from 20 to 0.002 mole of diketone of the formulas (1) and (2). The preferred polymers are synthesized with molar ratios of the tetra-amine, the tetraketone and the di-ketone which may range from 100/99.999/0.002 to 100/95/10.

When the cross-linking agent is di-functional and is present only inside the chains, as in the polymers of the formula (24) where X and Y are radicals Ar$_1$, or in the polymers of the formula (26), the cross-linking rate depends on the amount of cross-linkable tetraketone of the formula (3), (4), (5) or (6). The cross-linking criterion is then the molar proportion of these compounds with respect to the total amount of the tetra-ketone reactants. As a matter of fact, in that case, the difference of stoichiometry between the tetraamine and the tetraketone has no significance as far as the crosslinking is concerned since the functional groups in excess are neutralized by molecules which cannot be cross-linked.

The enameling varnish may consist of co-polymers prepared with an least one tetra-amine of the formula (17) and a mixture of at least one tetraketone of the formula (18) and at least one tetraketone of the formula (3), (4), (5) or (6). For 100 moles of tetra-ketone reactants, there is used from 99.999 to 80 moles of tetraketone of the formula (18) and from 0.001 to 20 moles of cross-linkable tetraketone. Preferred co-polymers are those prepared with a mixture of non-cross-linkable and cross-linkable tetra-ketones in respective molar proportions which may range from 99.999/0.001 to 95/5 for 100 moles of tetra-ketone reactants.

When using an excess of tetra-ketone with respect to the tetra-amine, 90 to 99.999 parts by mole of tetra-amine are used for 100 parts by mole of tetra-ketones. When the excess of α-diketone functions is blocked by an aromatic ortho-diamine, there is preferably used from 20 to 0.002 parts by mole thereof.

When the cross-linking agents are fixed both at the ends and inside the macromolecular chains, as in the polymers of formula (24) where X is a phenyl group and Y is a radical of formula (13) or (14), the cross-linking rate is given by the total amount of biphenylene or biquinoxalylene introduced. Preferably the copolymer compositions contain from 0.1 to 10% by mole of cross-linkable centers.

The synthesis of the thermosetting polyarylquinoxalines according to the invention may be effected in such a manner as to directly produce the enameling varnish in solution. The starting monomers are selected in dependence on the temperature of use of the varnish. The starting reactant in excess is dissolved or suspended in the polycondensation solvent. The latter is usually a phenolic solvent, preferably m.cresol. The oxidation of the aromatic tetra-amines is avoided by conducting the reaction in inert nitrogen or argon atmosphere. The other monomer(s) are then added portionwise while stirring the reaction medium and waiting, before each new addition, until the preceding one has reacted at least in major part. This technique favors the formation of linear polymers. When close to the stoichiometry, the viscosity of the solution is tested repeatedly; when it attains a value of, for example, 2000 to 7000 centipoises at 20° C., the functional groups in excess, which constitute the ends of the chains, are neutralized by addition of an equivalent amount of antagonistic groups. The enameling varnishes may be used directly in this form, or they can be modified by adding a diluent or any other compound adapted to facilitate the enameling operation.

The invention will be more precisely described in the specific examples reported below, in which the details are given for illustration purposes, not limitation. In these examples, the inherent viscosity ($\eta$inh.) of the polymers, expressed in dl/g, is determined at 30° C. with a 0.5 g/dl concentration in m.cresol. The absolute viscosity of the solutions, expressed in centipoises (cP), is determined at 25° C. with a cone-and-plate Feranti viscosimeter.

The preliminary adherence and flexibility tests are effected by spreading on a metal sheet, usually a copper sheet, of 2 mm thickness, a solution of polymer, so as to obtain, after evaporation of the solvent, an enamel layer of 0.025 mm thickness and 2 cm width. The behavior of the varnish is then observed when the metal sheet is subjected to a tensile stress up to the breaking of the metal, and then when it is bent at 90° and 180°. If the varnish resists bending at 90° and at 180° without cracks and loss of adherence, it is considered respectively as good (G) and very good (VG). If very few cracks appear, it is considered as pretty good (PG); in all other cases, it is considered as bad (B).

The thermoplasticity of the varnishes is measured with copper wires of 1 mm nominal diameter, on which the enamel layer has brought the diameter to 1.05 mm, according to the French Standard NF—C 31–462. The glass transition temperature is determined by differential thermal analysis. It is noted as Tg.

The examples 13 to 48 illustrate the invention. The other examples are destined either to illustrate the manufacture of the starting materials or to illustrate the use of operating conditions which do not comply with the invention.

EXAMPLE 1 (comparison)

This example shows that the polyphenylquinoxalines of high molecular weight, prepared according to the prior art by quickly mixing the reactants, cannot be used as enameling varnishes.

0.545 g (1.59 mmole) of 1,4-bis (phenylglyoxyloyl) benzene are dissolved in 6.3 g of m.cresol in a vessel equipped with a stirrer and maintained in a nitrogen atmosphere. 0.341 g (1.59 mmole) of 3,3-diamino-benzidine is added in 10 mm to this solution. After a 45 mm stirring at room temperature, the mixture is so viscous that 1.5 g m.cresol must be added to maintain stirring overnight. The viscosity is then $10^6$ centipoises. The polymer, isolated by settling in methanol, has an inherent viscosity of 3.15 dl/g. A film of varnish deposited on a copper sheet from a 5% solution, separates from the support after solvent evaporation.

The very high values of the viscosity show that the quick addition of the reactants has favored the reactions of branching between the macromolecular chains.

EXAMPLE 2 (comparison)

This example shows that the linear polyphenyl-quinoxalines of high molecular weight prepared by slow addition of the reactants cannot be used for preparing enameled wires.

3.082 g (9 mmole) of 1,4-bis (phenylglyoxyloyl) benzene divided into 8 identical portions are added in 8 hours to a suspension of 2.1428 g (10 mmole) of 3,3'-diamino-benzidine in 50 g of m.cresol. The reaction is continued for 1 hour after each addition and for one night after the last addition. 0.342 g (1 mmole) of the same tetraketone is then added in 5 identical portions with 1 h reaction between each addition and 10 h after the last one. The viscosity of the solution is higher than 100 000 cP and the inherent viscosity of the polymer is 2.5 dl/g. The solution is brought to a 5% concentration of solid matter by adding 55 g of a mixture of m.cresol and xylene by equal volumes.

The spreading of the enamel on the copper wire requires about 20 passages in the solution. This enamel has low adherence, good flexibility, a thermoplasticity of about 355° C. and a Tg of 365° C.

EXAMPLES 3 to 8 (comparison)

In the conditions of example 2, 3,3'-diaminobenzidine is reacted with 1,4-bis (phenylglyoxyloyl) benzene with various differences of stoichiometry in favor of the latter. The reaction is effected by adding the tetra-amine to a suspension of the tetraketone (10 mmole) in 50 g of m.cresol. The results are given in Table I.

TABLE I

| | Polyphenylquinoxalines terminated with α-diketone groups. | | | | | | |
|---|---|---|---|---|---|---|---|
| EXAMPLE No. | DAB[a] (mmole) | PGB[a] (mmole) | Viscosity (cP) | $\eta$inh. dl/g | Adh.[b] | Flexib.[b] | Thermoplast.[b] (°C.) |
| 3 | 9.4 | 10 | 1440 | 0.51 | PG | PG | 310 |
| 4 | 9.6 | 10 | 2035 | 0.70 | G | G | 320 |
| 5 | 9.8 | 10 | 2700 | 0.82 | G | VG | 325 |
| 6 | 9.9 | 10 | 3950 | 0.90 | VG | VG | 330 |

TABLE I-continued

| | Polyphenylquinoxalines terminated with α-diketone groups. | | | | | | |
|---|---|---|---|---|---|---|---|
| EXAMPLE No. | DAB[a] (mmole) | PGB[a] (mmole) | Viscosity (cP) | ηinh. dl/g | Adh.[b] | Flexib.[b] | Thermoplast.[b] (°C.) |
| 7 | 9.95 | 10 | 5200 | 1.3 | G | VG | 350 |
| 8 | 9.99 | 10 | 50000 | 2.1 | B | G | 365 |

[a]DAB:diaminobenzidine; PGB:bis-phenylglyoxyloylbenzene.
[b]Adherence, flexibility and thermoplasticity of the enamel deposited on copper.

The enameling varnishes of examples 3 to 8 have good properties of flexibility and adherence; however their thermoplasticity temperature is too low for a continuous use at 300°–350° C. They are also quickly attacked by the phenol solvents and the halogenated solvents.

EXAMPLES 9 to 12 (comparison)

1,4-bis (phenylglyoxyloyl) benzene is reacted in the conditions of example 2 with 3,3'-diamino benzidine used in excess, thus preparing polyphenylquinoxalines terminated with o-diamine groups. The results are given in Table 2.

TABLE 2

| EXAMPLE No. | DAB (mmole) | PGB (mmole) | Viscosity (cP) | ηinh. dl/g | Adh. | Flexib. | Thermoplast. (°C.) |
|---|---|---|---|---|---|---|---|
| 9 | 10 | 9.4 | 990 | 0.56 | PG | PG | 320 |
| 10 | 10 | 9.6 | 2820 | 0.78 | G | G | 332 |
| 11 | 10 | 9.8 | 4800 | 0.95 | G | VG | 337 |
| 12 | 10 | 9.9 | 6140 | 1.10 | G | VG | 342 |

The varnishes of the examples 9 to 12 have also good properties of flexibility and adherence; however their thermoplasticity temperature is too low and the presence of the terminal ortho-diamine groups favors the thermal degradation of the varnish. After 400 h of use at 300° C., the varnish layer became friable and brittle.

EXAMPLE 13

67.1 g (0.196 mole) of 1,4-bis (phenylglyoxyloyl) benzene is progressively added to a suspension of 42.855 g (0.2 mole) of diaminobenzidine in 1000 g of m.cresol and then, at the end of the reaction, 2.3 g of 2-phenylglyoxyloyl biphenylene is added. The solution has a viscosity of 5,000 cP for a polymer concentration of about 10%. The polymer has an inherent viscosity of 0.95 dl/g and a Tg of 340° C.

The enamel deposited from this solution is transparent, flexible and has outstanding adherence to copper. Its thermoplasticity is 450° C., i.e. the cross-linking agent has increased it by more than 100° C.

After 1000 hours of use at 300° C., the varnish exhibits no sign of oxidation or surface defect.

The varnish is not attacked by the solvents of the polyquinoxalines, even after a 50 h contact at 100° C.

EXAMPLES 14 to 16

Polyphenylquinoxaline varnishes are prepared with the molar proportions of the examples 9, 10 and 12; except that 0.1 mole of 3,3'-diamino benzidine is used instead of 0.01 mole. At the end of the polycondensation reaction, the ortho-diamine groups in excess are blocked by adding 2-phenylglyoxyloyl biphenylene as indicated in Table 3.

TABLE 3

| EXAMPLE No. | PGB (mole) | Diketone[a] (mole) | Viscosity (cP) | ηinh. dl/g | Adh. | Flexib. | Thermoplast. (°C.) |
|---|---|---|---|---|---|---|---|
| 14 | 0.094 | 0.012 | 1260 | 0.57 | G | G | 540 |
| 15 | 0.096 | 0.008 | 3050 | 0.80 | VG | VG | 490 |
| 16 | 0.099 | 0.002 | 6200 | 1.15 | VG | VG | 420 |

[a]Diketone of the formula (1).

EXAMPLES 17 to 33

Thermosetting polyphenylquinoxalines are prepared as in example 13 by reacting with an aromatic tetra-amine of the general formula:

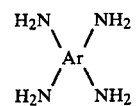

first a bis-α-diketone of the formula $C_6H_5-CO-CO-Ar'-CO-CO-C_6H_5$ with progressive introduction of this ketone as explained before, then an α-diketone which may be 2-phenylglyoxyloyl biphenylene of the formula (1) or 2-phenylglyoxyloyl biquinoxalylene of the formula (2). The reactions are conducted at 20° C. in m.cresol at a polymer concentration which may range from 9 to 15% b.w., so that the enameling solution has a viscosity preferably between 3000 and 6000 cP. Table 4 indicates the nature of the hydrocarbons corresponding to the radicals Ar and Ar' with, into brackets, the positions of substitution of the radicals Ar by the amine groups and the positions of substitution of the radicals Ar' by the phenylglyoxyloyl groups. The α-diketones are represented by the numbers (1) or (2) of their formulas. Table 4 also gives the amounts of reactants.

TABLE 4

| | Polyphenylquinoxalines of the formula (21) | | | | | |
|---|---|---|---|---|---|---|
| EXAMPLE | Tetra-amine | | Bis-αdiketone | | αdiketone | |
| No. | Ar[a] | mmole | Ar'[a] | mmole | formula | mmole |
| 17 | BP (3,3',4,4') | 10 | B (1,4) | 9.5 | (2) | 1 |
| 18 | " | 100 | B (1,3) | 98 | (1) | 4 |
| 19 | " | 10 | " | 9.85 | (2) | 0.3 |
| 20 | " | 100 | BP (4,4') | 98 | (1) | 4 |
| 21 | " | 10 | m.T (4,4") | 9.9 | (1) | 0.2 |
| 22 | " | 100 | DPE (4,4') | 98.5 | (1) | 3 |
| 23 | B (1,2,4,5) | 10 | DPE (4,4') | 9.75 | (1) | 0.5 |
| 24 | DPE (3,3',4,4') | 10 | B (1,4) | 9.75 | (1) | 0.5 |
| 25 | " | 100 | DPE (4,4') | 98 | (1) | 4 |
| 26 | DPC (3,3'4,4') | 100 | B (1,4) | 97.5 | (1) | 5 |
| 27 | " | 10 | " | 9.9 | (2) | 0.2 |
| 28 | " | 10 | B (1,3) | 9.9 | (1) | 0.2 |
| 29 | " | 10 | DPE (4,4') | 9.7 | (1) | 0.6 |
| 30 | DPM (3,3'4,4') | 10 | B (1,4) | 9.85 | (1) | 0.3 |
| 31 | " | 10 | B (1,3) | 9.75 | (1) | 0.5 |
| 32 | " | 10 | DPE (4,4') | 9.8 | (2) | 0.4 |
| 33 | DPS (3,3'4,4') | 10 | B (1,4) | 9.9 | (1) | 0.2 |

[a]B:benzene; BP:biphenyl; DPE:diphenylether; DPC:diphenylketone; DPM:diphenylmethane; DPS:diphenylsulfone; m.T:m-terphenyl.

The solutions of polyphenylquinoxalines prepared in the conditions reported in Table 4 are used to enamel copper wires or sheets. A part of each solution is also used to determine the properties of the polymers before passage in the enameling oven, particularly their inherent viscosity and their glass transition temperature. The latter value can be used to follow up the cross-linking phenomenon when it is compared to the thermoplasticity of the varnish after enameling. It is seen in Table 5 that even the polymers constituted of flexible linkages of the diphenylether type have considerably improved properties, which make them useful in a higher temperature range.

TABLE 5

| Varnish of polyphenylquinoxaline of the formula (21) | | | | | |
|---|---|---|---|---|---|
| POLYMER of EXAMPLE No. | ηinh. (dl/g) | Tg (°C.) | Thermoplast. (°C.) | Adherence | Flexibility |
| 17 | 0.60 | 340 | 520 | VG | VG |
| 18 | 0.92 | 320 | 430 | G | VG |
| 19 | 1.01 | 318 | 400 | G | G |
| 20 | 0.79 | 335 | 485 | G | G |
| 21 | 1.18 | 315 | 380 | VG | VG |
| 22 | 0.96 | 275 | 365 | VG | VG |
| 23 | 0.76 | 305 | 405 | G | G |
| 24 | 0.70 | 295 | 385 | VG | VG |
| 25 | 0.94 | 260 | 365 | G | VG |
| 26 | 0.69 | 285 | 395 | G | G |
| 27 | 1.05 | 287 | 340 | VG | VG |
| 28 | 1.21 | 275 | 325 | G | VG |
| 29 | 0.68 | 270 | 355 | VG | VG |
| 30 | 0.79 | 285 | 370 | G | G |
| 31 | 0.70 | 265 | 355 | G | G |
| 32 | 0.94 | 258 | 350 | G | VG |
| 33 | 1.10 | 315 | 375 | G | G |

EXAMPLE 34

A mixture, as homogeneous as possible and which contains 33.21 g (0.097 mole) of 1,4-bis (phenylglyoxyloyl) benzene and 0.833 g (0.002 mole) of 2,6-bis (phenylglyoxyloyl) biphenylene is progressively added to a suspension of 21.43 g (0.1 mole) of 3,3'-diaminobenzidine in 450 g of m.cresol. At the end of the reaction, the o-diamine groups in excess are neutralized by adding 0.42 g (0.002 mole) of benzil. The viscosity of the solution containing about 10.5% of polymer is 5110 cP and the inherent viscosity of the copolymer is 0.89 dl/g. Before enameling, the glass transition temperature is 338° C., although the thermoplasticity of the enamel is close to 400° C. This copolymer yields a transparent, flexible and adherent enamel.

EXAMPLES 35 to 40

Various copolymers are prepared, as in example 34, with diaminobenzidine, 1,4-bis (phenylglyoxyloyl) benzene, and various proportions of the tetraketones of the formulas (3), (4), (5) and (6). Table 6 gives the amounts of reactants.

TABLE 6

| | Polyphenylquinoxalines of the formula (24) | | | | | | |
|---|---|---|---|---|---|---|---|
| | | | 2nd Tetraketone | | | | |
| EXAMPLE No. | DAB (mmole) | PGB (mmole) | Formula No. | mmole | Benzil (mmole) | Viscosity (cP) | ηinh. (dl/g) |
| 35 | 10 | 9.8 | (3) | 0.1 | 0.2 | 5250 | 0.985 |
| 36 | 10 | 9.6 | (3) | 0.3 | 0.2 | 4180 | 1.05 |
| 37 | 10 | 9.5 | (3) | 0.4 | 0.2 | 4200 | 1.13 |
| 38 | 10 | 9.6 | (4) | 0.3 | 0.2 | 5100 | 1.09 |
| 39 | 10 | 9.55 | (5) | 0.35 | 0.2 | 4980 | 0.92 |
| 40 | 10 | 9.65 | (6) | 0.25 | 0.2 | 3130 | 0.99 |

When used as enameling varnishes, these polymers give outstanding results as concerns flexibility and adherence. The thermoplasticity is higher than 450° C. and the resistance to oxidation for 1000 hours at 300° C. is fairly good.

EXAMPLE 41

A copolymer is prepared with the same proportions of reactants as in example 34. However, at the end of the polycondensation reaction, the functional o-diamine groups are neutralized by reaction with 0.57 g of 2- phenylglyoxyloyl biphenylene instead of benzil. The polymer solution has a viscosity of 5200 cP and the copolymer has the following properties: ηinh.=0.92 dl/g; Tg=340° C.

This solution gives an enamel of good quality with a thermoplasticity of 440° C.

EXAMPLES 42 to 47

Solutions of enameling varnishes containing crosslinking agents on the inside and at the ends of the macromolecular chains (Table 7) are prepared as in example 41. All varnishes have a thermoplasticity between 420° and 470° C. and very good properties.

TABLE 7

| EXAMPLE No. | DAB (mmole) | PGB (mmole) | 2nd Tetraketone | | Diketone | | ηinh. dl/g |
|---|---|---|---|---|---|---|---|
| | | | Formula No. | mmole | Formula No. | mmole | |
| 42 | 10 | 9.8 | (3) | 0.01 | (1) | 0.2 | 0.86 |
| 43 | 10 | 9.85 | (3) | 0.05 | (1) | 0.2 | 0.92 |
| 44 | 10 | 9.8 | (3) | 0.1 | (2) | 0.2 | 0.82 |
| 45 | 10 | 9.8 | (4) | 0.15 | (1) | 0.1 | 1.10 |
| 46 | 10 | 9.75 | (5) | 0.15 | (2) | 0.2 | 0.90 |
| 47 | 10 | 9.55 | (6) | 0.35 | (2) | 0.2 | 0.96 |

EXAMPLE 48

33.21 g (0.097 mole) of 1,4-bis (phenylglyoxyloyl) benzene and 1.25 g (3 mmole) of 2,6-bis (phenylglyoxyloyl) biphenylene are suspended in 460 g of m.cresol and 21.2 g (0.099 mole) of diaminobenzidine is added stepwise. At the end of the reaction, the α-diketone groups of the chain ends are reacted with 0.22 g of orthophenylene diamine. The resultant solution has a viscosity of 4500 cP for a polymer concentration of about 10.5%. The copolymer has an inherent viscosity of 0.86 dl/g, a Tg of 340° C. and the enamel deposited from this solution has a thermoplasticity of 440° C.

What is claimed:

1. A thermosetting polyarylquinoxaline which comprises inside the polymeric chain or at the ends thereof, in addition to arylquinoxaline recurrent units, at least one biphenylene or biquinoxalylene unit, and whose inherent viscosity, determined at 30° C. at a concentration of 0.5 g/dl in m.cresol, is from 0.5 to 1.3 dl/g.

2. A polyarylquinoxaline according to claim 1, having the formula:

T(P)$_n$(B)$_m$T  (7)

wherein P is a polyarylquinoxaline recurrent unit having the formula:

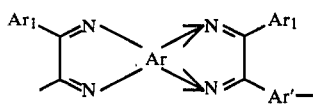

wherein Ar is a carbocyclic or heterocyclic tetravalent aromatic group whose four valences are located pairwise, each valence being on a different carbon atom, and each pair being on carbons ortho to one another; Ar' is a carbocyclic divalent aromatic group whose two valences are located on different carbon atoms; Ar$_1$ is a carbocyclic monovalent aromatic group; and n is a positive integer;

wherein B is a unit having the formula:

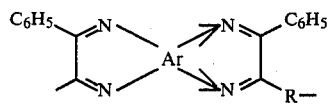

wherein Ar is defined as above; R is a divalent biphenylene or biquinoxalylene group; and m is zero or a positive integer;

wherein each T is independently a group having the formula:

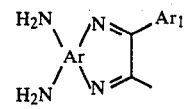

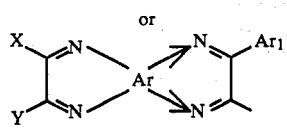

wherein Ar and Ar$_1$ are defined as above; X is a carbocyclic monovalent aromatic group; and Y is a monovalent aromatic group having the formula:

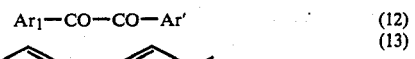

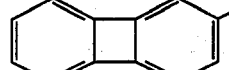

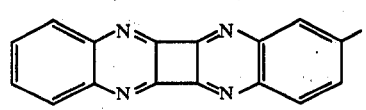

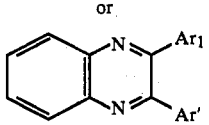

wherein Ar' and Ar$_1$ are defined as above;
and wherein at least one of the following conditions is satisfied:
(a) m is a positive integer, or
(b) Y has the formula (13) or (14).

3. A polyarylquinoxaline according to claim 2, produced by the reaction of at least one diketone of the formula:

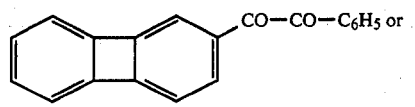

-continued

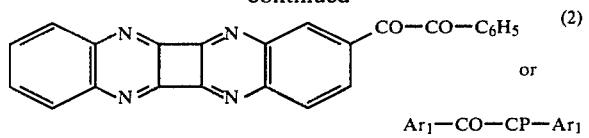  (2)

or

Ar₁—CO—CP—Ar₁ with the polycondensation product of at least one tetraketone of the formula:

Ar₁—CO—CO—Ar'—CO—CO—Ar₁   (18)

where Ar' and Ar₁ are defined as in claim 2, with an excess, with respect to the tetraketone, of at least one tetra-amine of the formula:

  (17)

where Ar is defined as in claim 2.

4. A polyarylquinoxaline according to claim 3, produced by the reaction of from 20 to 0.002 parts by mole of diketone of the formula (1) or (2) with the polycondensation product of 100 parts by mole of tetra-amine of the formula (17) with 90 to 99.999 parts by mole of tetraketone of the formula (18).

5. A polyarylquinoxaline according to claim 3, wherein said polycondensation product is produced by the reaction of a mixture, in major proportion, of a tetraketone of the formula (18) and, in minor proportion, of a tetraketone of the formula:

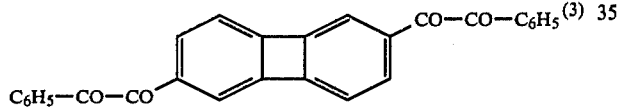  (3)

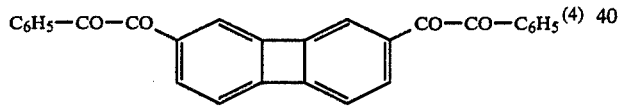  (4)

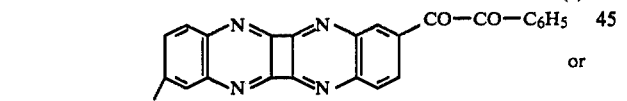  (5)

or

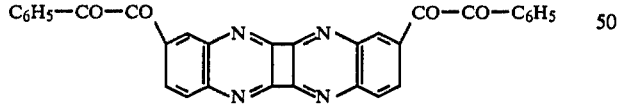  (6)

with an excess, with respect to all the ketones, of at least one tetra-amine of the formula (17)

6. A polyarylquinoxaline according to claim 5, wherein said polycondensation product is obtained by using 90 to 99.999 parts by mole of the tetraketone mixture for 100 parts by mole of the tetra-amine, the mixture of the tetraketones comprising 99.999 to 80 parts by mole of the tetraketones of the formula (18) and 0.001 to 20 parts by mole of a tetraketone according to one of the formulas (3) to (6).

7. A polyarylquinoxaline according to claim 6, wherein 20 to 0.002 parts by mole of said diketone for 100 parts by mole of tetra-amine are reacted with said polycondensation product.

8. A polyarylquinoxaline according to claim 2, produced by the reaction of at least one tetra-amine of the formula:

  (17)

where Ar is defined as in claim 2, with an excess of a mixture of at least one tetraketone of the formula:

Ar₁—CO—CO—Ar'—CO—CO—Ar₁   (18)

in major proportion
and at least one tetraketone of the formula:

  (3)

  (4)

  (5)

or

  (6)

in minor proportion.

9. A polyarylquinoxaline according to claim 8, obtained by the reaction of 90 to 99.999 parts by mole of tetra-amine of the formula (17) with 100 parts by mole of the mixture of tetraketones, present in said mixture in relative molar proportions of 99.999 to 80% of tetraketone of the formula (18) for 0.001 to 20% of tetraketone of any one of the formulas (3) to (6).

10. A polyarylquinoxaline according to claim 2, obtained by reacting the product of claim 10 with an aromatic orthodiamine.

11. A polyarylquinoxaline according to claim 10, obtained by reacting 20 to 0.002 parts by mole of the aromatic orthodiamine.

12. A polyarylquinoxaline according to claim 3 wherein the reaction of the tetra-ketone with the tetra-amine is effected by progressive introduction of one of the reactants into the whole other reactant, and waiting before each addition until the preceding fraction has reacted at least in major part.

13. A polyarylquinoxaline according to claim 1 which comprises 0.1 to 10% by mole of cross-linkable centers of the biphenylene or biquinoxalylene type.

14. In an enameling varnish, the improvement wherein the varnish comprises the thermosetting polyarylquinoxaline of claim 1.

15. A polyarylquinoxaline according to claim 2, wherein the ratio m:n is 0.001:99.999–20:80.

16. A polyarylquinoxaline according to claim 2, wherein the ratio m:n is 0.001:99.999–5:95.

17. A polyarylquinoxaline according to claim 2, having the formula

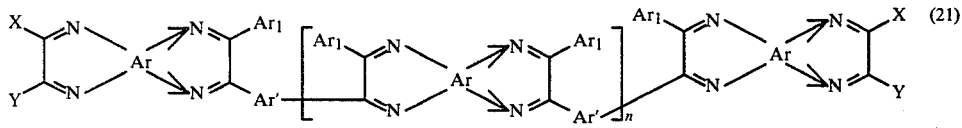

wherein Ar, Ar', Ar₁, X, Y and n are as defined in claim 2.

18. A polyarylquinoxaline according to claim 2, having the formula

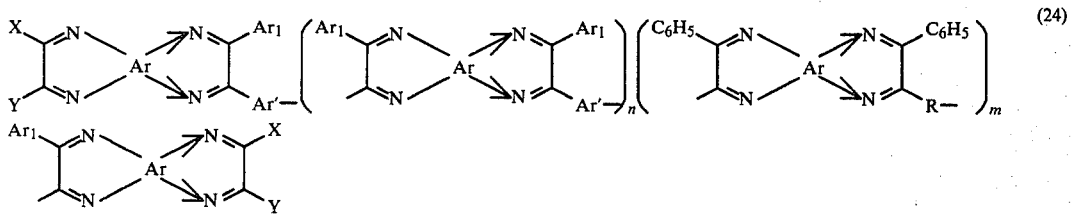

wherein Ar, Ar', Ar₁, m and n are as defined in claim 2; X is Ar₁; and Y is Ar₁, biphenylene, or biquinoxalylene.

19. A polyarylquinoxaline according to claim 18, wherein X and Y are phenyl.

20. A polyarylquinoxaline according to claim 2, having the formula

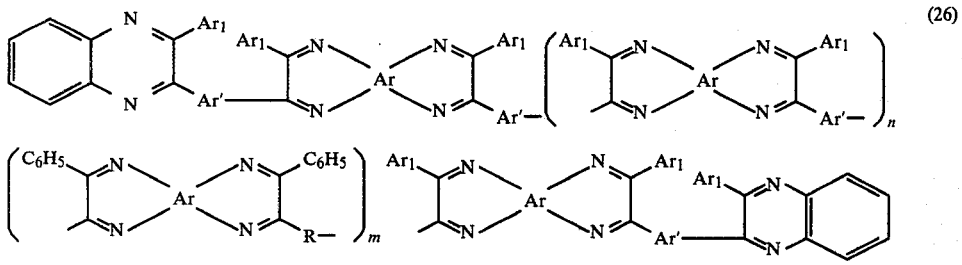

wherein Ar, Ar', Ar₁, n and m are as defined in claim 2.

21. In an enameling varnish, the improvement wherein the varnish comprises the thermosetting polyarylquinoxaline of claim 2.

22. In an enameling varnish, the improvement wherein the varnish comprises the thermosetting polyarylquinoxaline of claim 17, 18, 19 or 20.

23. In a metallic electrical conductor coated with an insulating resin coating, the improvement wherein said insulating resin is a thermally crosslinked thermosetting polyarylquinoxaline according to claim 2.

24. In a metallic electrical conductor coated with an insulating resin coating, the improvement wherein said insulating resin is a thermally crosslinked thermosetting polyarylquinoxaline according to claim 17, 18, 19 or 20.

25. The conductor of claim 23 which is a copper conductor.

26. The conductor of claim 25, which is a copper wire.

* * * * *